(12) United States Patent
Phillips et al.

(10) Patent No.: US 12,110,398 B2
(45) Date of Patent: Oct. 8, 2024

(54) METALLIC BISMUTH PIGMENTS

(71) Applicant: SUN CHEMICAL CORPORATION, Parsippany, NJ (US)

(72) Inventors: Blayne Phillips, Cincinnati, OH (US); Jonathan Doll, Cincinnati, OH (US); Jami Bennett, Cincinnati, OH (US); Lisa Clapp, Cincinnati, OH (US); Russell Schwartz, Cincinnati, OH (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 572 days.

(21) Appl. No.: 17/318,502

(22) Filed: May 12, 2021

(65) Prior Publication Data

US 2021/0261784 A1    Aug. 26, 2021

Related U.S. Application Data

(63) Continuation of application No. PCT/US2019/060929, filed on Nov. 12, 2019.

(60) Provisional application No. 62/767,001, filed on Nov. 14, 2018.

(51) Int. Cl.
    *C09C 1/00*     (2006.01)
    *C09C 1/62*     (2006.01)
    *C09D 11/037*   (2014.01)

(52) U.S. Cl.
    CPC .......... *C09C 1/0021* (2013.01); *C09C 1/0015* (2013.01); *C09C 1/006* (2013.01); *C09C 1/622* (2013.01); *C09D 11/037* (2013.01); *C01P 2004/24* (2013.01); *C01P 2004/54* (2013.01); *C01P 2004/61* (2013.01); *C01P 2006/60* (2013.01); *C01P 2006/62* (2013.01); *C01P 2006/63* (2013.01); *C01P 2006/64* (2013.01); *C09C 2200/1054* (2013.01); *C09C 2200/24* (2013.01); *C09C 2200/308* (2013.01); *C09C 2200/405* (2013.01); *C09C 2220/20* (2013.01)

(58) Field of Classification Search
    CPC ....... C09C 1/0021; C09C 1/006; C09C 1/622; C09C 1/0015; C09C 2200/1054; C09C 2200/24; C09C 2200/308; C09C 2200/405; C09C 2220/20; C09D 11/037; C01P 2004/24; C01P 2004/54; C01P 2004/61; C01P 2006/60; C01P 2006/62; C01P 2006/63; C01P 2006/64

See application file for complete search history.

(56) References Cited

U.S. PATENT DOCUMENTS

| | | | |
|---|---|---|---|
| 2,334,738 A * | 11/1943 | Wulff | C10M 1/08 508/150 |
| 3,389,116 A * | 6/1968 | Saha | C09D 5/10 106/404 |
| 4,321,087 A | 3/1982 | Levine et al. | |
| 2010/0047199 A1 | 2/2010 | Trummer et al. | |
| 2011/0179971 A1 | 7/2011 | Proelss et al. | |

FOREIGN PATENT DOCUMENTS

| | | |
|---|---|---|
| CN | 106825589 B | 7/2018 |
| EP | 037930 | 12/1989 |
| WO | WO 1989/000471 | 1/1989 |
| WO | WO 94/02551 * | 2/1994 |
| WO | WO 2002/036695 | 5/2002 |
| WO | WO 2003/066697 | 8/2003 |
| WO | WO 2020/102200 | 5/2020 |

OTHER PUBLICATIONS

International Search Report and Written Opinion dated Apr. 3, 2020 for International Application No. PCT/US19/60929, 11 pages.

* cited by examiner

*Primary Examiner* — Patrick D Niland
(74) *Attorney, Agent, or Firm* — Frost Brown Todd LLC

(57) ABSTRACT

It has been found that bismuth can be milled into pigment platelets. A metallic pigment comprises bismuth metal and an organic additive. The pigment is platelet shaped. In addition, the platelet shaped pigment comprising bismuth metal can be produced by physical vapor deposition (PVD) methods. In some embodiments, the metallic pigment comprises multiple layers.

18 Claims, No Drawings

METALLIC BISMUTH PIGMENTS

CROSS REFERENCE TO RELATED APPLICATIONS

The present application is a continuation of U.S. Serial No. PCT/US19/60929, entitled "METALLIC BISMUTH PIGMENTS," filed Nov. 12, 2019, which hereby claims the benefit of the provisional patent application of title "Metallic Pigments," Ser. No. 62/767,001, filed on Nov. 14, 2018, the disclosures of which are herein incorporated by reference in their entirety.

BACKGROUND

Metallic effect pigments are platelet-shaped, inorganic pigments that can impart an object with a shiny, metallic appearance when applied to an object. This is characterized by a light-to-dark "flip-flop" effect when viewed from different angles.

Bismuth has been used in the pigment industry as a component of the inorganic colorants bismuth vanadate and bismuth oxychloride.

BRIEF SUMMARY

A metallic pigment comprises bismuth metal and an organic additive. The pigment is platelet shaped These and other objects and advantages shall be made apparent from the description thereof.

DETAILED DESCRIPTION

The applicants have surprisingly found that bismuth can be milled into pigment platelets. The metallic pigment comprises bismuth metal and an organic additive. The pigment is platelet shaped. In addition, the platelet shaped pigment comprising bismuth metal can be produced by physical vapor deposition (PVD) methods.

The color of pigments comprising bismuth metal is different from aluminum; they a gold to champagne color space. Pigments produced by PVD have a high gloss gold to champagne color. The use of these pigments allows for a high gloss pigment with a unique color space.

Corrosion of metal pigments flakes is also a concern for paint and ink formulators. Environmental oxygen and moisture can react with aluminum pigments which can alter their appearance over time at the point of application. Additionally, aluminum poses safety concerns due to its susceptibility to produce hydrogen gas in aqueous systems. This reaction makes formulating low VOC coatings and inks a challenge. The pigment comprising bismuth metal (bismuth pigment) is more resistant to corrosion so are more stable and safer.

In some embodiments, its milled and PVD forms have a reddish-brown champagne color due to the oxide that forms on the surface of the bismuth. The low reactivity also benefits the appearance by preventing degradation of optical appearance. It's low reactivity and low toxicity will also enable the use of cosmetic formulations using bismuth pigments where other metals may be prohibited.

The bismuth pigment is platelet shaped, which means that one dimension of the bismuth pigment particle is smaller than the other two dimensions. The smaller dimension is typically called the height of the platelet and the largest dimension is called the diameter of the platelet. The ratio of the diameter divided by the height is called the aspect ratio. In some embodiments, the average aspect ratio of the pigment is from about 50 to about 2000, such as about 100 to about 2000, about 200 to about 2000, about 50 to about 2000, about 50 to about 1500, about 50 to about 1000, about 50 to about 500, about 100 to about 1500, about 100 to about 1000, about 100 to about 500, about 200 to about 1500, about 200 to about 1000, and about 200 to about 500. In some embodiments, the bismuth metal or alloy is thick enough that it is not transparent or semi-transparent, it is opaque. In some embodiments, the bismuth metal or alloy is thin enough that it is semi-transparent. In some embodiments, the bismuth pigment has a thickness of from about 5 nm to about 100 nm.

In some embodiments, the pigment has a monodispersed size. In some embodiments, the pigment comprises a distribution of particle sizes. In some embodiments, the pigment has a number of different shapes and is not be a true cylinder. For example, the pigment may be a polygon with >2 sides when viewed from the top. In some embodiments, the pigment has a mean particle size (d50) in the range of about 1 to about 500 µm, such as about 5 to about 500 µm, about 10 to about 500 µm, about 20 to about 500 µm, about 50 to about 500 µm, about 100 to about 500 µm, about 5 to about 250 µm, about 5 to about 200 µm, about 5 to about 100 µm, about 5 to about 50 µm, about 10 to about 250 µm, about 20 to about 250 µm, about 50 to about 250 µm, about 100 to about 250, about 10 to about 200 µm, about 20 to about 200 µm, about 50 to about 200 µm, and about 100 to about 200. In some embodiments, the mean particle height (h50) is from about 5 nm to about 1000 nm.

In some embodiments, examples of the platelet shape are cornflake, silver dollar, and VMP. By cornflake, it is meant that the platelet has a shape that is characterized by having rough edges and surface. By silver dollar, it is meant that the flakes are more circular with a smooth surface. The general shape of cornflakes and silver dollars are achieved by mechanical means, such as ball milling. By VMP, what is meant is a vapor metalized pigment that is product via physical vapor metallization before being removed and pigmentized. VMP-shaped pigments are pigments that have an ultra-smooth surface and uniform flake thickness. Vacuum metalized flakes are very thin with very uniform flake thickness.

In some embodiments, the metal in the pigment comprising bismuth metal (bismuth pigment) is about 75% or more bismuth metal, such as about 80% or more bismuth metal, about 85% or more bismuth metal, about 90% or more bismuth metal, about 95% or more bismuth metal, 98% or more bismuth metal, and 99% or more bismuth metal. In some embodiments, the metal in the pigment is an alloy comprising bismuth and one or more other elements. In some embodiments, the one or more other elements is selected from H, O, N, C, Cl, Br, I, F, Cd, Pb, Al, Zn, Mn, Cu, Zn, In, Sn, Sb, Ag, and mixtures thereof.

The bismuth pigment comprises an organic additive, which can assist in the milling and prevent cold welding of the pigment. In some embodiments the organic additive is a lubricant. The lubricant comprises from about 0.1% to about 10% of the total pigment weight. Examples of lubricants include many organic molecules that are surface active and prevent cold welding. By surface active, it is meant that the lubricant will adhere to the surface of the bismuth metal to coat it and prevent cold welding and agglomeration. Examples of lubricants include compounds with a structure of R—X, where R is a head group that provides surface activity and X is an aliphatic moiety that is sticking up from the surface of the pigments. Suitable functional groups for R include, carboxylic acids, phosphate ester, phosphonates, ester (—C=O(OR')) (where R' may be an aliphatic chain or a glycerol that links to additional fatty acid chains), thiols, amines, amides, alcohols, carbamates, nitro, or other functional groups. X is typically a branched, cyclic, or linear aliphatic group comprised of 6-22 carbons. X may be saturated or unsaturated. The lubricant used may also be modified with any number of silicate, silocane groups, phosphate ester, titanate, or zirconate groups. The lubricant used may also comprise a combination of described lubricant structures. In some embodiments the organic additive is a polymer.

In some embodiments, the bismuth pigment comprises one or more inorganic outer layers. These layers have a range of purposes and may be used to alter the optical properties of the pigment or protect the pigment. The thickness of the individual metal oxide layers is from about 5 to about 1000 nm. Examples of the layers includes, but is not limited to, silicon dioxide, bismuth oxide, bismuth oxychloride, titanium dioxide, zinc oxide, zirconium dioxide, tin oxide, cerium dioxide, vanadium (IV) oxide, manganese oxide, lead oxide, chromium oxide, iron (II) oxide, iron (II,III) oxide, iron (III) oxide, aluminum oxide, tungsten oxide, and mixtures and alloys thereof. The coating may also be a doped oxide of any of the aforementioned.

In some embodiments, the bismuth pigment does not comprise any additional inorganic or metal comprising layers.

In some embodiments, the bismuth pigment is coated with one or more organic layers. An example of an organic layer is a polymer. Polymers used to coat the bismuth pigment include, but are not limited to, polyesters, polyamides, polysiloxanes, polyacrylates, polystyrenes, polyalkyl acrylates, polyolefins, and mixtures and copolymers thereof. The polymers may have a linear, branches or crosslinked morphology and may be adhered to the surface of the pigment or any other layer that may be on the pigment. The thickness of these organic layers is from about 5 to about 1000 nm.

In some embodiments, the bismuth pigment is coated with a passivating inhibitor layer and/or with a passivating anti-corrosion layer. These coatings will increase the reliability of use of the pigments in waterborne systems and/or in outdoor applications, while minimally affecting the gloss and color of the bismuth pigments. The mechanism of action of the passivating layers is complex. In the case of inhibitors, it is mostly based on steric effects. The major part of inhibitors also has an orienting effect in the sense of leafing and non-leafing as its consequence, i.e. floating or non-floating in the application medium. The inhibitors are usually added at low concentration of about 0.1% to about 15% by weight, based on the weight of the bismuth pigment. Examples of inhibitors include, but are not limited to, organically modified phosphonic acids or phosphoric acids and/or their esters of the general formula R—P(O) (OR$_1$) (OR$_2$) or R—O—P(OR$_1$)(OR$_2$), where: R=alkyl, alkyl-aryl, aryl-alkyl, or alkyl ethers such as ethoxylated alkyl ethers, and R$_1$, R$_2$=H or C$_n$H$_{2n+1}$, with n=1 to 12, such as 1 to 6, it being possible for alkyl in each case to be branched or unbranched. R$_1$ may be same or different to R$_2$.

In some embodiments, the passivating inhibitor layer comprises corrosion-inhibitors, such as, organically functionalized silanes, aliphatic or cyclic amines, aliphatic or aromatic nitro compounds, oxygen-, sulfur and/or nitrogen containing heterocycles. Examples include, but are not limited to, thiourea derivatives, sulfur and/or nitrogen compounds of higher ketones, aldehydes and or/alcohols (fatty alcohols) and/or thiols, zirconates, titanates or mixtures thereof. Preferences is given to organic phosphonic acids and/or phosphoric esters or mixtures thereof. When amine compounds are used, they preferably have organic radicals having more than 6-22 C atoms.

In some embodiments, the bismuth pigment is produced by media milling. The milling process involves grinding coarse bismuth powder and a lubricant in the presence of milling media over a set period of time. It is also possible to perform the milling in the presence of a solvent. The coarse bismuth powder is mechanically deformed into a platelet shape. The bismuth oxidizes during the process resulting in a golden-brown color. Without being bound by theory, it is believed the bismuth oxide layer forms a barrier on the platelet shaped bismuth pigment.

The size and span of the coarse bismuth powder grit particle distribution is important to the bismuth effect pigments. During the deformative milling, the bismuth particles are not deformed with full uniformity; this means that certain particles are more greatly deformed, while a fraction of the coarse powder particles are only deformed at a very late stage during grinding. It is believed that one of the reasons for this is the fact that the deformation probability of a particle is dependent on its size. Thus, particles which have already undergone preliminary deformation to form platelets possess a greater probability of undergoing further deformation. The breadth of the size distribution of the coarse bismuth powder is therefore a factor in the size distribution of the bismuth pigments formed from it. Therefore, to achieve a pigment with a wide distribution of sizes, it is necessary to use a powder with a wide variation in size. In order to describe particle size distribution, the following terms are defined: d50 is the median size of the particles, d90 is the size in which 90% of the particles are smaller, and d10 is the size where 10% of the particles are smaller. The span is calculated by (d90–d10)/d50. In some embodiments, the d50 of the bismuth powder grit ranges from about 1 μm to about 100 μm. In some embodiments, the span ranges from about 0.5 to about 1.9.

In some embodiments, the bismuth powder grit is produced by shaving bismuth ingots and classifying the shavings via sieving. In some embodiments, the bismuth powder grit is produced by atomization of liquid bismuth. The low boiling point of bismuth makes the atomization method possible. The coarse powder made by this method have a largely round form. In some embodiments, the bismuth powder grit is produced by bubbling gas into molten bismuth forming a bismuth sponge which can then be crushed. In some embodiments, the bismuth powder grit is produced as demonstrated in WO1989000471, which is herein incorporated by reference, which describes centrifugal disintegration using a rotating cup.

Deformation of the bismuth into a platelet shape is accomplish by grinding in the presence of milling media. In some embodiments, the weight ratio of the milling balls to bismuth particles is from about 5 to about 200. The milling media can take the shape of balls, beads, satellites, cylinders, cubes, pyramids, any number of prisms, cones, cone segments, cylpebs, etc. or any mixture thereof. The shape may also be a segment of or combination of segments of any of the aforementioned shapes. The shape of media may also be uniform with low deviation between each milling media unit or may have low uniformity with high deviation between each milling media unit. The surface of the media may be smooth and polished, or rough.

In some embodiments, the milling media have an average size of from about 0.5 to about 5 mm. The size of the media may have a very uniform size distribution or be a mixture of different sized media resulting in a multimodal distribution.

The milling material may consist of steels, glasses, ceramics, plastics or mixtures thereof. Types of steel may include but are not limited to chrome steel, stainless steel, low carbon steel and high carbon steel. Types of glass may include but are not limited to borosilicate glass, soda lime glass or lead-free glass. Types of ceramic may include but are not limited to alumina, zirconium toughened alumina, silicon carbide, silicon nitride, zirconia silica, fused zirconium oxide, magnesium oxide stabilized zirconium oxide, yttria stabilized zirconium oxide or tungsten carbide. Types of plastic may include but are not limited to polystyrene, polycarbonate, polyamide or acrylics.

The milling of the bismuth powder to form platelets may take place dry or wet, i.e., in the presence of solvents. In some embodiments, the milling is carried out in a solvent, with a weight ratio of solvent to bismuth particles of about 0.5 to about 8. Examples of solvents include, but are not limited to mineral spirits, mineral oil, naphtha, alcohols, aliphatic hydrocarbons, aromatic hydrocarbons, halogenated solvents, ethers, ketones, esters, water, hydrogen chlorides, and mixtures thereof.

Wet milling is typically more gentle than dry milling, and with wet milling any additive, such as an oxidation inhibitor, oxidation promoter, or anticorrosion agents are distributed uniformly on the whole of the milled material. From the considerations of safety, wet milling or deformation is preferable. Finely divided metallic powders carry fire and explosivity hazards and is therefore better handled in a non-pulverulent way. Wet milling allows for the material to be classified more easily after each mill stage. The milling of bismuth powder may take place in conventional mills, as for example stirred ball mills, edge runner mills, drum ball mills, and rotary tube ball mills.

In some embodiments, from about 1% to about 30% by weight of lubricant by weight based on the weight of the bismuth powder is used during the milling process. Corrosion-inhibiting lubricants may also be used to control the degree of oxidation of the bismuth which may be advantageous. To prevent cold welding of the powder particles, lubricant or inhibitors added in an amount dependent on the particular free specific surface area of the bismuth pigments may be used.

Milling may be done in a horizontal ball mill, bead mill, attritor mill, or any mill where a grinding occurs by milling media impacting powder. In relation to grinding in a ball mill, the critical speed ($n_{crit}$) is an important parameter, indicating the point in time at which the particles are pressed against the mill wall by the centrifugal forces, and grinding virtually no longer takes place:

$$n_{crit} = \sqrt{\left(\frac{g}{2\pi^2} \cdot \frac{1}{D}\right)}$$

Where D is the drum diameter and g is the gravitational constant.

The rotational speeds in ball mills are 10% to 80% of the critical speed ($n_{crit}$).

Grinding maybe carried out in one operation in two or more operations. For example, in the case of two grinding stages, grinding balls differing in size may be used in each case. Due to the brittleness of bismuth, the duration of milling time is comparatively short. Milling time is set to achieve the desired particle size distribution of bismuth pigment. Where grinding is carried out in two or more stages, these grinding times are understood to be the total time of the grinding duration. Milling time must be sufficient to provide for a sufficient number of impacts between the milling balls and the bismuth metal to occur, resulting in the formation of metallic bismuth platelets. Excessive grinding time may result in deformed bismuth particles breaking into smaller pieces and increasing their surface area. The increase in surface area and the high energy of milling result in the formation of fine oxide particles that are undesirable.

In milling of metallics to form pigments, deformation is favored over communition. Due to the brittleness of bismuth lower rotational speeds are preferred so that the deformation process is favored over the communition process during milling. Fractures due to ball impacts with high kinetic energy should be avoided.

Following the milling or deforming of the bismuth powder, the bismuth pigments are separated from the milling media, such as the milling balls.

In some embodiments, a further step in the method, the bismuth pigment obtained is subjected to size classification. The classification is carried out gently, in order not to destroy the bismuth pigment. Examples of classification include, but are not limited to, a wet sieving, a decantation, and a separation by sedimentation (using gravity or centrifuging). In case of wet sieving, the coarse fraction is screened out. With the other techniques, the fine fraction may be separated off. The suspension is subsequently separated from excess solvent, for example with the aid of a filter press, centrifuge, or filter.

In some embodiments, the bismuth pigment may be produced using a physical vapor deposition process (PVD). The PVD process for creating metallic pigments is generally described in reference U.S. Pat. No. 4,321,087, which is hereby incorporated by reference. To produce bismuth pigments in this way, a carrier sheet is first coated with a release layer. The release layer can be formed using any type of press that will transfer a smooth uniform layer of release resin or by passing that carrier through a vat of coating solution. The carrier is then passed through a vacuum metallizer, where metallic bismuth is coated. The carrier can then be coated with subsequent release resin and bismuth layers in an alternating fashion. The carrier coated with alternating metal and resin layers is then passed through a stripper which serves to remove the platelets form the carrier through some mechanical process, chemical processes or any combination of these processes. The bismuth platelets are then reduced to pigmentary sizes by high shear mixing and/or sonication.

Examples of the carrier sheet include, but are not limited to a polyolefin film, polyester film, polyamide film, fluoropolymer film, vinyl polymer film, polyurethane film, polystyrene film, and cellophane. Suitable release coatings include those materials which are easily solubilized and on which bismuth films may be deposited. Examples of such release coatings include but are not limited to polymers, polyvinyl chloride, polystyrene, chlorinated rubber, acrylonitrile-butadiene-styrene copolymer, nitro-cellulose, cellulose acetate butyral, methyl methacrylate, acrylic copolymers, fatty acids, waxes, gums, gels, and mixtures thereof. The coating can be produced using any number of methods, these include flexographic, gravure, offset, inkjet, or dip-coating the release resin onto the carrier. In some embodiments, the release coating is coated with a thickness in the range of from about 0.1 g/m$_2$ to about 1.0 g/m$_2$. The carrier can be coated with release resin on one or both sides.

The carrier with release coating can be metallized on one or both sides of the carrier. In some embodiments, the thickness of the bismuth coating produced is from about 4 nm to about 150 nm and is controlled by the speed of the web and the rate of evaporation of the bismuth metal. The evaporation of the bismuth metal may be carried out using methods such as induction, resistance, electronic beams, and sputtering.

In some embodiments, the metallic pigment comprises three or more layers. The bismuth metal or alloy is a layer (bismuth comprising layer). There are one or more layers comprising a dielectric (dielectric layer) and there are one or more layers comprising a metal (additional metal layer). The dielectric layers are between the bismuth comprising layer and the additional metal layer. In some embodiments, the bismuth comprising layer is thick enough that it is not transparent or semi-transparent, it is opaque. In some embodiments, the bismuth comprising layer is thin enough that it is semi-transparent.

In some embodiments, additional layers of inorganic compound are coated onto the release resin before the bismuth metal deposition, and/or onto the bismuth metal layer. In this manner the bismuth metal layer will be coated on both sides with an inorganic material. In some embodiments, the thickness of each inorganic layer is from about 4 nm to about 300 nm. In this way a platelet pigment with a three-layer design is made, where an inorganic compound surrounds the bismuth comprising layer. In some embodiments, a 5-layer design can be made where 2 inorganic layers surround the bismuth comprising layer. The structure of this 5-layer design will be $M_2/D/M_1/D/M_2$. Where $M_1$ describes the inner metallic core, such as the bismuth comprising layer, D is a dielectric layer that resides on one side of $M_1$; and $M_2$ is a metal layer that is deposited on the dielectric layer D. In some embodiments, the pigment may comprise a 7-layer, 9-layer or any larger number of layers design by increasing the number of inorganic layers on either side of the bismuth comprising layer. In some embodiments, the layer design is asymmetrical, so there is a 2-layer design, 4-layer design, 6-layer design, or more layer design.

The metal $M_1$ and $M_2$ may be the same metal or they may be different. However, at least one of the metals, $M_1$ and $M_2$ comprises bismuth metal. In some embodiments, the thickness of $M_1$ is much larger than the thickness of $M_2$. In some embodiments, the thickness of $M_1$ is such that the platelet is opaque, such as the range of about 60 to about 200 nm. In some embodiments, the thickness of $M_2$ is such that the layer is partially transparent, such as in the range of about 1 to about 60 nm. Examples of metals $M_1$ and $M_2$ include but are not limited to bismuth, aluminum, copper, gold, silver, iron, chromium, lead, magnesium, titanium, tungsten, zirconium, tin, zinc, nickel, palladium, platinum or mixtures and alloys thereof.

The dielectric layer D may be any organic or inorganic material that qualifies as a non-conducting or semiconducting material. Examples of these include small molecule organics, UV-cured monomers, polymers, ceramics, metal oxides, metal sulfides, metal chalcogenides, nitrides, carbides and the like. In some embodiments, the thickness if the dielectric D is in the range of about 20 to about 600 nm. More than one dielectric may be deposited at a single time, either as another layer or as a co-deposition with another dielectric.

If the dielectric, D, is a small molecule, then it may be deposited on the central metal, $M_1$, via any known method to cast a film, such as solution casting, printing, spray coating, spin coating, dip coating, vapor deposition, and the like. Examples of small molecules include any organic or organometallic materials or their mixtures from the group including quinacridones, phthalocyanines, porphyrins, perylenes, dyes, melamine, anthracenes, and like.

If the dielectric, D, is a polymer, then it may be deposited on the central metal, $M_1$, via any known method to cast a film, such as solution casting, printing, spray coating, spin coating, dip coating, UV curing, energy curing, vapor deposition and the like. Examples of polymers include mixtures, blends and copolymers from the following classes of materials: polyolefins, polyurethanes, polyamides, polyimides, polyacetate, fluoropolymers, polyacrylates, polymethacrylates, polyesters, polysiloxane, urea-formaldehyde, melamine-formaldehyde, polyacetal, and the like.

If the dielectric, D, is an inorganic material or ceramic, then it may be deposited on the central metal, $M_1$, via any known method to cast an inorganic or ceramic film, such as solution casting of particles, printing, spray coating, spin coating, dip coating, vapor deposition and the like. Examples of inorganic materials include silicon dioxide, bismuth oxide, bismuth oxychloride, titanium dioxide, zinc oxide, zirconium dioxide, tin oxide, cerium dioxide, vanadium (IV) oxide, manganese oxide, lead oxide, chromium oxide, iron (II) oxide, iron (II,III) oxide, iron (III) oxide, aluminum oxide, tungsten oxide, titanium nitride, titanium carbide, silicon carbide, silicon nitride, magnesium fluoride, aluminum fluoride, zirconium fluoride, calcium fluoride, ytterbium fluoride, strontium titanate, zinc sulfide, cadmium sulfide, lead sulfide, gallium arsenide, cadmium telluride, zinc telluride, zinc selenide, cadmium selenide, bismuth vanadate, and mixtures and alloys thereof.

The carrier is then passed through any number of stripping processes. This process may be chemical; solvent is used to dissolve the resin releasing the platelets from the carrier. This process may also be mechanical; rollers, scrapers and air knives can exfoliate the bismuth platelet and resin layers from the carrier. The stripping can be performed by using the release resin layer to remove the bismuth platelets from the carrier sheet.

The platelets can be allowed to settle or centrifuged so that a concentrated suspension is obtained. The platelets are then broken up into particles. In some embodiments, the platelets are reduced to proper pigment size by a sonolator, which operates by ultrasonic action and thereby does not destroy the color and reflectivity of the bismuth pigment. In some embodiments, the platelets are reduced to pigment size by high shear mixing. Solvent exchange of a slurry of the concentrated pigment can be obtained with solids collected at approximately 30%.

In some embodiments, the bismuth pigment is coated with multiple passivating layers or protective barriers. Inorganic layers may be coated onto flakes using methods known to those familiar with the art. For example, silicon dioxide may be coated onto the surface of the bismuth pigment using the solgel method. An inorganic may further comprise metal oxides and/or fluorides such as of silicon dioxide, bismuth oxide, bismuth oxychloride, titanium dioxide, zinc oxide, zirconium dioxide, tin oxide, cerium dioxide, vanadium (IV) oxide, manganese oxide, lead oxide, chromium oxide, iron (II) oxide, iron (II,III) oxide, iron (III) oxide, aluminum oxide, tungsten oxide, magnesium fluoride, ytterbium fluoride, yttrium fluoride, thorium fluoride, and mixtures and alloys thereof. Organic layers may be coated onto the surface of the bismuth pigment via polymerization of synthetic resins on the surface of bismuth platelet. Passivating layers such as phosphoric, phosphonic, titanate and zirconate, and hybrids thereof may be coated on the platelet via direct addition during the milling step or by blending as a paste or slurry.

In some embodiments, the bismuth pigment comprises a solvent. In some embodiments, the bismuth pigment is substantially free of a solvent, such as less than about 5% of a solvent by weight, or less than about 2% of a solvent by weight.

In some embodiments, the bismuth pigment is in the form of a powder, paste, slurry, or pellet. Powders are in a form that is about 75% or more by wt. bismuth platelets, such as about 90% or more; with the remainder being solvent and lubricant. Pastes are in a form that is about 20 to about 98% by wt. bismuth platelets; with the remainder being solvent and lubricant. Slurries are a dispersed mixture of the bismuth pigments and a solvent, such as less than 20% bismuth pigment by wt. Pellets are in the forms of bismuth pigment dispersed into resin. These pellets may be in the shape of pellets, tablets, noodles, granules, briquettes, or sausages. The solvents used in the powder, paste, and slurry may include but are not limited to alcohols, aliphatic hydrocarbons, aromatic hydrocarbons, halogenated solvents, ethers, ketones, esters, water, hydrogen chlorides, and mixtures thereof.

In some embodiments, the bismuth pigment additionally comprises resin. In the case of slurries and pastes resin may be on the surface of the platelet or dissolved in the solvent. In the case of pellets, the bismuth pigments are dispersed into the resin. In the case of powders, the resins are provided on the surface of the flake. These resins may include but are not limited to polyolefins, polyacrylates, poly alkyl acrylates, polystyrenes, polysiloxanes, polyesters, polyamides, vinyl polymers, epoxies, cellulose based resins, natural waxes, or copolymers, and mixtures thereof.

In some embodiments, the bismuth pigment may be processed to the desired form. For example, the bismuth pigments may be converted into a paste form. The solids content in this case is from about 50% to about 95% by weight.

In some embodiments, the bismuth pigments is converted by drying into a powder form, such as a non-dusting powder form. The dry powder may be processed further in a suitable homogenizer to give a non-dusting metal powder, by addition of very small amount of solvent (<5%). It is also possible first to dry the filter cake and then to paste it up again with a different solvent (re-wetting).

In some embodiments, the bismuth pigment is added to a suitable dispersion of an appropriate resin to convert the filter cake, into granules, pellets, briquets, tablets or sausages. These forms have the advantages that they are non-dusting, are easy to meter, and have outstanding dispersability.

Pelletizing may be carried out on a pelletizing plate in a conventional way. Tableting may take place in a tableting apparatus. The sausages may be produced by a compression molding process from bismuth pigment paste or powder or by extruding a bismuth pigment paste through an extruder using a rotary knife arrangement to chop up the extruded paste strands. Granulating the bismuth pigment can be done, for example, by spray granulation. The bismuth pigment can be provided in granules or pellets with high pigment contents, of about 95% by weight to about 35% by weight. For pelletizing, a large amount of the dispersing resin can be used. Examples thereof include both naturally occurring and synthetic resins, such as, alkyd resins, polyesters, polyamides, polysiloxanes, polyacrylates, polystyrenes, polyalkyl acrylates, polyolefins, and mixtures and copolymers thereof. Examples of naturally occurring resins include, but are not limited to gum Arabic, gutta percha, casin, and gelatin.

The bismuth pigment and bismuth pigment preparations can be incorporated, for example into coatings, paint systems, varnishes, printing inks, powders coatings, plastics, securities printing and security printing, and cosmetics.

The bismuth pigment can be mixed with conventional color pigments or dyes. The conventional color pigments typically have average particle sizes 0.05 to 5 µm and include both organic and inorganic pigments. Examples of inorganic color pigments, which can be used, are chromatic, black, and white pigments. Examples of typical organic pigments that can be used are chromatic and black pigments.

The bismuth pigment can be employed in coatings, paints, varnishes, printing inks, powder coatings, plastics, cosmetic formulations, and as pigments in the securities printing segments, and also as a reflector material in multilayer effect pigments. In these applications they may find use as an effect pigment.

A coated article may comprise the bismuth pigment. In some embodiments, the bismuth pigment is used in printing inks. The ink may be a liquid printing ink, such as gravure, flexographic, screen, or intaglio printing ink.

Gravure flexographic or screen printing inks may comprise solvents or solvent mixtures. One of the purposes of the latter is to dissolve the binders, but another is to set important properties of the printing inks, such as the viscosity or the drying rate, for example.

Examples of solvents used for liquid printing inks such as flexographic and gravure inks are low-boiling solvents. The boiling point as a general rule is not more than 140° C. Higher-boiling solvents are used only in relatively small amounts to set the drying rate. The formulation of screen printing inks is similar to that of flexographic or gravure inks, except that they are given a slightly higher viscosity, and typically comprise solvents having a somewhat higher boiling points.

Examples of suitable solvents for liquid printing inks include but are not limited to ethanol, 1-propanol or 2-propanol, substituted alcohols such as ethoxypropanol, esters such as ethyl acetate, isopropyl acetate, n-propyl acetate, and n-butyl acetate. It is of course also possible to use mixtures of different solvents. For example, a mixture may be of ethanol and esters such as ethyl acetate or propyl acetate. For example, a mixture may be of ethanol and esters such as ethyl acetate or propyl acetate. For printing with flexographic printing plates, it is generally advisable for the fraction of the esters as a proportion of the total solvent not to exceed about 20%-25% by weight. In some embodiments, water may be use as a solvent for liquid printing inks.

In some embodiments, the printing ink comprises about 10% to about 75% by weight of solvent, relative to the sum of all constituents, such as about 20% to about 65%.

Radiation-curable printing inks generally do not contain the aforementioned solvents, but instead comprise reactive diluents. Reactive diluents typically fulfill a dual function. They act to crosslink or cure the printing ink and they also adjust the viscosity. Examples include butyl acrylate, 2-ethylhexylacrylate, polyfunctional acrylates such as 1,4-butanediol di (meth)acrylate, 1,6-hexanediol di(meth(acrylate), or trimethylopropane tri(meth)acrylate.

In some embodiments, the preparation comprises binders that are customary for liquid printing inks. Depending on the desired end application and on the desired properties, the skilled formulator makes an appropriate selection. Examples of suitable binders include polyesters, polyamides, PVC copolymers, aliphatic and aromatic ketone resins, melamine-urea resins, melamine-formaldehyde resins, maleates, rosin derivatives, casein and casein derivatives, ethyl cellulose, nitro cellulose or aromatic and/or aliphatic polyurethanes. Use may also be made of polymers or copolymers of vinyl acetate, vinyl alcohol, acrylates, methacrylates, vinylpyrrolidone or vinyl acetals. Of particular advantage may be the use of hyperbranched polymers containing functional groups, examples being hyperbranched polyurethanes, polyureas or polyesteramides, as disclosed by WO 02/36695 and WO 03/366697. It is of course also possible to use mixtures of different polymeric binders, subject to the condition that the binders selected do not exhibit unwanted properties when in combination with one another. The amount of all binders is typically 1%-20% by weight, relative to the sum of all of the constituents of the printing ink.

Binders used for water-reducible metallic printing inks include, in particular, copolymers based on (meth)acrylic acid and or/esters thereof with styrene. Further examples include aromatic and aliphatic aqueous polyurethanes, polyesters, and aqueous polyamides.

Binders for paste-like printing inks include, for example, rosins and modified rosins. Examples of modified rosins include rosins esterified partly or wholly with polyols such as glycerol or penta-erythritol, for example.

Radiation-curable printing inks comprise binders which comprise crosslinkable groups, such as olefinic groups, vinyl ether groups or epoxide groups, for example. Here, the sum of the binders (including reactive diluents) is generally in a range of 1%-20% by weight of all the constituents of the printing ink.

In some embodiments, printing inks comprising the bismuth pigment further comprise one or more auxiliaries or additives. Examples of additives and auxiliaries are fillers such as calcium carbonate, aluminum oxide hydrate or aluminum silicate or magnesium silicate. Waxes increase the abrasion resistance and serve to increase the lubricity. Examples are in particular, polyethylene waxes, oxidized polyethylene waxes, petroleum waxes or ceresin waxes. Fatty acid amides maybe used to increase the surface smoothness. Plasticizers serve to increase the elasticity of the dry film. For radiation-curable printing inks at least one photoinitiator or photoinitiator system is used as an additive. Dispersing assistants may be used in order to disperse the effect pigments. Fatty acids may be used to bring about floating of the pigments in the printed layer, so that the pigments are accumulated in/at the upper boundary surface of the printed layer. Advantageously improved metallic effects may be obtained by this means. Anti-settling agents may be added as well. Such additions prevent settling of the pigment. Examples include silica, cellulose derivatives or else waxes.

In some embodiments, inks comprising the bismuth pigment are produced by dispersing or mixing the constituents in customary apparatuses such as dissolvers or stirring mechanisms. When using dissolvers, the skilled worker will ensure that the energy input is not too high, so as to prevent damage to the bismuth pigment. Though, the energy input must be high enough to allow proper dispersal of the pigments and constituents of the ink. If typical color pigments are used alongside the bismuth pigment, it may be advisable to pre-disperse these color pigments in a portion or in the entirety of the solvent, binder and where appropriate, auxiliaries of the metallic printing ink, and not to add the bismuth pigment until later. In this way, the additional pigments are dispersed to particularly good effect, without damage to the bismuth pigments from excessive dispersing. It is also possible to add pre-dispersed pigment concentrates or preparations. Especially elegant in this context may also be the use of commercial printing ink in small amounts, subject to the condition that the added printing ink is compatible with the formula of metallic printing ink and does not impair its properties.

In some embodiments, a coated article comprises the bismuth pigment. In some embodiments, the bismuth pigment is used in coatings. The coating may be, for example, organic solvent paints, aqueous paints, oil paints, emulsion paints and/or powder paints. In some embodiments, the bismuth pigment is used used in functional coating materials, such as for the reflection of thermal radiation. The bismuth pigment has very good chemical resistance, light stability, and weathering stability. In these coatings, the amount of bismuth pigment is from about 20% to about 80% by weight.

In some embodiments, the bismuth pigment comprises a coupling agent on its surface in order to improve dispersibility in coating systems. Examples of coupling agents include silane or titanate compounds.

I some embodiments, the coating additionally comprises binders. Depending on the desired end application and on the desired properties, the skilled formulator makes an appropriate selection. Suitable binders include, for example, acrylic resin, alkyd resin, unsaturated resin, amino resin, melamine resin, polyurethane resin, epoxy resin, polyamide resin, phenolic resin, cellulose resin, polyvinyl resin, silicone resin and/or fluororesin. It is of course also possible to use mixtures of different polymeric binders, subject to the condition that the binders selected do not exhibit unwanted properties when in combination with one another. The amount of all binders is typically about 1% to about 30% by weight of the coating system.

In some embodiments, the coating additionally comprises additional constituents. These constituents are, for example, pigment, organic pigment, inorganic pigment, dyes, anti-sagging agent, viscosity-controlling agent, anti-settling agent, crosslinking promoter, curing agent, leveling agent, surface-controlling agent, defoaming agent, plasticizer, antiseptic agent, mildew-proofing agent, UV stabilizer, etc.

Coatings may be applied to any number of surfaces including but not limited to wood, plastics, steel sheets, glass, ceramics, paper, films and sheets. Examples of the applications of the paints are automobiles, buildings, ships, electric and electronic appliances for household use, cans, industrial machines and instruments, road marking, plastics, household painting, etc.

Regarding its structure, the painted film may comprise, for example, an under-coat layer, an intermediate-coat layer, a layer containing the bismuth pigment, and a clear coat layer that are layered in that order; or an under-coat layer, a layer containing the bismuth pigment, and a clear-coat layer layered in that order. The coating process includes electrostatic coating, air spraying, airless coating, roll coating, dipping, etc.

In some embodiments, the bismuth pigment is incorporated into a cosmetic formulation. In some embodiments, the bismuth pigment is incorporated into a formulation such as a cosmetic formulation at a loading in the range of 0.01%-50% with respect to the total weight of the formulation. If the bismuth pigment is incorporated into formulation such as a cosmetic formulation, then the cosmetic formulation may contain one or more of the following constituents liquid dilutants, powder dilutants, chelating agents, humectants, rheology modifiers, emulsifiers, co-emulsifiers, synergists, emollients, UV filters, thickeners, preservatives, desurfactants, detergents, conditioning agents, stabilizers, stabilizing polymers, fillers, structurants, neutralizers, vitamins, minerals, pearlizing agents, botanical extracts, antioxidants, occlusive, skin feel enhances, powder fillers, waxes, oils, mineral oils, shine enhancers, fragrances, binders, dry binders, dyes, organic pigments, organic pigments, effect pigments, and other additives and ingredients known to those skilled in the art.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Example 1

A mixture of 126 g of 200-mesh bismuth powder (Atlantic Equipment Engineers, USA), 130 g of mineral spirits, and 2.5 g of oleic acid were charged into a 500 mL Attritor mill. Grinding was performed in the mill with 1.6 kg of 3 mm stainless-steel media at 400 RPM for 1 hr. The ground product and milling balls were discharged, sieved and filtered to produce a 95% solid pigment paste. The d50 particle size of the resulting pigment was 20.5 µm.

Comparative Example 2

The commercially available aluminum pigment Benda Lutz 6042 (Sun Chemical, USA).

Example 3

Same as Example 1 except the 3 mm stainless steel media were replaced by 1.24 kg 3 mm yttria-stabilized ceramic media. The d50 particle size of the resulting pigment was 29.4 µm.

Example 4

A mixture of 126 g of 325-mesh bismuth powder (Alfa Aesar), 130 g of mineral spirits, and 2.4 g of stearic acid were charged into a 500 mL Attritor mill. Grinding was performed in the mill with 1.6 kg of 3 mm stainless-steel media at 125 RPM for 2 hr. The ground product and milling balls were discharged, sieved and filtered to produce a 95% solid leafing pigment paste. The d50 particle size of the resulting pigment was 8.8 µm.

Example 5

A mixture of 126 g of 200-mesh bismuth powder (5N Plus, Inc., USA), 130 g of mineral spirits, and 2.4 g of stearic acid were charged into a 500 mL Attritor mill. Grinding was performed in the mill with 1.24 kg of 3 mm yttria-stabilized ceramic media at 400 RPM for 2 hr. The ground product and milling balls were discharged, sieved and filtered to produce a 95% solid pigment paste. The d50 particle size of the resulting pigment was 17.8 µm.

TABLE 1

Particle size data for Examples 1-5 showing the d10, d50, and d90 of the distribution.

| Mill runs | Particle size data | | |
|---|---|---|---|
| | d10 (µm) | d50 (µm) | d90 (µm) |
| Example 1 | 9.2 | 20.5 | 35.1 |
| Comparative Example 2 | 8.2 | 21.6 | 38.8 |
| Example 3 | 12.6 | 29.4 | 51.4 |
| Example 4 | 2.8 | 8.8 | 17.3 |
| Example 5 | 7.2 | 17.7 | 35.6 |

The particle size data in Table 1 show that different size distribution of bismuth pigment can be obtained using different mill conditions, including but not limited media type, mill speed, lubricant and bismuth grit.

Example 6 Bismuth Coated with Black Iron Oxide 36 g of paste from Example 1 was dispersed in 460 g 17% ethanol in water in a 1 L reactor and heated to 75° C. 28 g of a 10.7% solution of iron (II) sulfate heptahydrate was added to the reactor. Subsequently, 10.7 g of a 6.5% solution of potassium nitrate in water was added to the reactor. 4.3 g of 20% aqueous sodium hydroxide was added to the reactor to reach an internal pH of 8. The reaction was stirred at constant pH for 1 hour. The reaction contents were drained and filtered. The solid was then dried overnight in a 60° C. oven to yield a lustrous gold-black pigment.

Example 7

Release resin was coated onto a PET film. 50 nm of bismuth was then vacuum deposited onto the surface of the coated film forming a multilayer film. The multilayer films were immersed in an excess of ethyl acetate to remove the bismuth from the PET. The resulting slurry was washed to remove excess resin. The resulting process yielded 200 g of a 2% bismuth flake slurry, which is agitated in a high-speed mixer using a 40 mm cowles blade at 2500 RPM for 1 hour. The resulting slurry is adjusted to a solids content is 10%.

Comparative Example 8

Commercially available pigment slurry SPLENDAL 6003 EA/IPA (Sun Chemical, USA).

Example 9—Automotive Refinish

The pigments of examples 1 to 6 were incorporated into an automotive refinish paint system at a pigment loading of 14% (DeBeers Refinish, Valspar, USA). The paints were drawn down on a black and white Leneta chart using a #3 Bird Applicator. The color and lightness were evaluated using an X-Rite multi-angle spectrophotometer on all samples. The lightness flop was evaluated and calculated using the formula $FI=(2.69*(L*15-L*110)^{1.11})/((L*45)^{0.85})$, where $L*15$, $L*45$, and $L*110$ are brightness of the displays measured at aspecular reflectance angles 15°, 45°, and 110°, respectively, when illuminated with D65 light at 45° incidence. The data is reported in Table 2.

TABLE 2 showing color values measured from drawn down auto refinish paints using X-Rite multiangle spectrophotometer. The illumination and CIELab color values were measured from an illumination angle of 45° and measured at 15° aspecular angle.

| Mill runs | L*15 | a*15 | b*15 | Flop |
|---|---|---|---|---|
| Example 1 | 98.31 | 4.14 | 6.76 | 15.25 |
| Comparative Example 2 | 129.23 | −0.55 | −3.91 | 13.39 |
| Example 3 | 78.33 | 3.46 | 6.28 | 11.62 |
| Example 4 | 75.19 | 3.04 | 6.99 | 10.08 |
| Example 5 | 101.12 | 4.08 | 7.79 | 15.10 |
| Example 6 | 74.91 | 4.82 | 11.58 | 12.56 |

When incorporated into the automotive refinish paint and applied to a surface the material from Examples 1, 2, 3 and 5 exhibit a non-leafing metallic effect. As seen in Table 2 from the a*15 and b*15 values the examples are redder and yellower resulting in a reddish-brown color, in comparison to the silver color of Example 2. The examples are also darker than the comparative example.

Example 10

Examples 1, 7, and 8 were combined with a 30% solids varnish of Mowital B16H (Kuraray, Tokyo, Japan) in ethyl acetate. The pigments were added at 2.5% pigment solids for Examples 7 and 8, and 20% pigment solids for Example 1. These inks were drawn down using wet film applicator rods (Mayer rod #6). Drawn down inks were evaluated for color and lightness flop. The measured values are shown in Table 3. The pigment of Example 7 had a unique champagne color when compared to the silver colored Comparative Example 8

TABLE 3 showing color values measured from drawn down flexo inks using X-Rite multiangle spectrophotometer.

| Mill runs | L*15 | a*15 | b*15 | Flop |
|---|---|---|---|---|
| Example 1 | 82.01 | 3.53 | 8.29 | 13.66 |
| Example 7 | 69.08 | 3.40 | 8.51 | 13.75 |
| Comparative Example 8 | 75.14 | −0.72 | −6.03 | 21.97 |

The PVD and milled bismuth both readily incorporated into the PVB binder system. Similar to the printing ink system Table 3 shows the bismuth inks are redder and yellower resulting and a reddish-brown champagne color.

Those skilled in the art having the benefit of the teachings as hereinabove set forth, can effect numerous modifications thereto. These modifications are to be construed as being encompassed within the scope of the present invention as set forth in the appended claims.

What is claimed is:

1. A metallic pigment comprising bismuth metal or alloy and an organic additive comprising a lubricant, wherein the pigment comprises one or more inorganic outer layers, is platelet shaped, and wherein the pigment comprises three or more layers, and one or more organic outer layers,
    wherein the bismuth metal or alloy is a bismuth comprising layer;
    wherein one or more layers comprises a dielectric layer;
    wherein one or more layers comprise an additional metal layer; and
    wherein the dielectric layers are between the bismuth-comprising layer and the additional metal layer.

2. The pigment of claim 1, wherein the metal in the pigment comprises 75% or more bismuth metal.

3. The pigment of claim 1, wherein the pigment comprises an alloy comprising bismuth and one or more other elements, wherein the one or more other elements is selected from H, O, N, C, Cl, Br, I, F, Cd, Pb, Al, Zn, Mn, Cu, Zn, In, Sn, Sb, Ag, and mixtures thereof.

4. The pigment of claim 1, wherein the pigment has a cornflake or silver dollar morphology.

5. The pigment of claim 1, wherein the pigment comprises more than two additional metal layers and more than two dielectric layers, wherein the dielectric layers are between two additional metal layers and between the bismuth comprising layer and the additional metal layers.

6. The pigment of claim 1, wherein the dielectric comprises a material selected from quinacridones, phthalocyanines, porphyrins, perulenes, dyes, melamine, anthracenes, polymers, inorganic materials, ceramics, metal oxides, metal sulfides, metal chalcogenides, nitride, carbides, and mixtures thereof.

7. The pigment of claim 1, wherein the additional metal comprises a material selected from bismuth, aluminum, copper, gold, silver, iron, chromium, lead, magnesium, titanium, tungsten, zirconium, tin, zinc, nickel, palladium, platinum, and mixtures and alloys thereof.

8. The pigment of claim 1, wherein the pigment is coated with one or more passivating layers.

9. The pigment of claim 1, wherein the average aspect ratio of the pigment is from 50 to 2000.

10. The pigment of claim 1, wherein the median particle size (d50) is from 1 to 500 microns.

11. The pigment of claim 1, wherein the thickness is from about 5 nm to about 100 nm.

12. A preparation comprising the pigment of claim 1, and a resin, wherein the preparation is in the form of a powder, paste, slurry, or pellets.

13. A process for making the pigment of claim 1 comprising mechanical milling or physical vapor deposition.

14. The pigment of claim 1, wherein the lubricant comprises a compound with a structure R—X,
    wherein R is selected form a carboxylic acid, phosphate ester, phosphate, ester (—C=O(OR')), thiol, amine, amide, alcohol, carbamate or nitro group, wherein R' is an aliphatic chain or a glycerol that links to additional fatty acid chains; and
    X is a branched, cyclic or linear aliphatic group comprised of 6-22 carbons which are saturated or unsaturated.

15. A metallic pigment comprising about 75% or more bismuth metal or alloy, and an organic additive comprising a lubricant, wherein the pigment is a platelet having a cornflake or silver dollar morphology, and wherein the pigment comprises three or more layers,
    wherein the bismuth metal or alloy is a bismuth comprising layer;
    wherein one or more layers comprise a dielectric layer;
    wherein one or more layers comprise an additional metal layer;
    wherein the dielectric layers are between the bismuth-comprising layer and the additional metal layer;
    wherein the pigment comprises an alloy comprising bismuth and one or more other elements, wherein the one or more other elements is selected from H, O, N, C, Cl, Br, I, F, Cd, Pb, Al, Zn, Mn, Cu, Zn, In, Sn, Sb, Ag, and mixtures thereof,
    wherein the pigment further comprises one or more organic outer layers; and wherein the pigment further comprises one or more inorganic outer layers.

16. A metallic pigment comprising about 75% or more bismuth metal or alloy, and an organic additive comprising a lubricant, wherein the pigment is a platelet having a cornflake or silver dollar morphology, and wherein the pigment comprises more than two additional metal layers and more than two dielectric layers, wherein the bismuth metal or alloy is a bismuth comprising layer;

wherein one or more layers comprise a dielectric layer;

wherein one or more layers comprise an additional metal layer;

wherein the dielectric layers are between two additional metal layers and between the bismuth comprising layer and the additional metal layers;

wherein the pigment comprises an alloy comprising bismuth and one or more other elements, wherein the one or more other elements is selected from H, O, N, C, Cl, Br, I, F, Cd, Pb, Al, Zn, Mn, Cu, Zn, In, Sn, Sb, Ag, and mixtures thereof;

wherein the pigment further comprises one or more organic outer layers;

and wherein the pigment further comprises one or more inorganic outer layers.

17. A metallic pigment comprising about 75% or more bismuth metal or alloy, and an organic additive comprising a lubricant, wherein the pigment is a platelet having a cornflake or silver dollar morphology, and wherein the pigment comprises more than two additional metal layers and more than two dielectric layers, wherein the bismuth metal or alloy is a bismuth comprising layer;

wherein one or more layers comprise a dielectric layer;

wherein one or more layers comprise an additional metal layer;

wherein the dielectric layers are between two additional metal layers and between the bismuth comprising layer and the additional metal layers;

wherein the pigment comprises an alloy comprising bismuth and one or more other elements, wherein the one or more other elements is selected from H, O, N, C, Cl, Br, I, F, Cd, Pb, Al, Zn, Mn, Cu, Zn, In, Sn, Sb, Ag, and mixtures thereof wherein the pigment further comprises one or more organic outer layers;

wherein the pigment further comprises one or more inorganic outer layers; and wherein the dielectric layer comprises a material selected from quinacridones, phthalocyanines, porphyrins, perulenes, dyes, melamine, anthracenes, polymers, inorganic materials, ceramics, metal oxides, metal sulfides, metal chalcogenides, nitride, carbides, and mixtures thereof.

18. A metallic pigment comprising about 75% or more bismuth metal or alloy, and an organic additive comprising a lubricant, wherein the pigment is a platelet having a cornflake or silver dollar morphology, and wherein the pigment comprises more than two additional metal layers and more than two dielectric layers, wherein the bismuth metal or alloy is a bismuth comprising layer;

wherein one or more layers comprise a dielectric layer;

wherein one or more layers comprise an additional metal layer, wherein the additional metal layer comprises a material selected from bismuth, aluminum, copper, gold, silver, iron, chromium, lead, magnesium, titanium, tungsten, zirconium, tin, zinc, nickel, palladium, platinum, and mixtures and alloys thereof;

wherein the dielectric layers are between two additional metal layers and between the bismuth comprising layer and the additional metal layers;

wherein the pigment comprises an alloy comprising bismuth and one or more other elements, wherein the one or more other elements is selected from H, O, N, C, Cl, Br, I, F, Cd, Pb, Al, Zn, Mn, Cu, Zn, In, Sn, Sb, Ag, and mixtures thereof;

wherein the pigment further comprises one or more organic outer layers;

wherein the pigment further comprises one or more inorganic outer layers; and wherein the dielectric layer comprises a material selected from quinacridones, phthalocyanines, porphyrins, perulenes, dyes, melamine, anthracenes, polymers, inorganic materials, ceramics, metal oxides, metal sulfides, metal chalcogenides, nitride, carbides, and mixtures thereof.

* * * * *